US010112500B2

(12) United States Patent
Liao et al.

(10) Patent No.: US 10,112,500 B2
(45) Date of Patent: Oct. 30, 2018

(54) AUTOMOBILE QUICK CHARGE CONTROL DEVICE

(71) Applicants: Jen Li Liao, New Taipei (TW); Yu Seng Liao, New Taipei (TW); Wen Hua Liao Hu, New Taipei (TW); Hsuan Hsien Liao, New Taipei (TW); Fang Ying Liao, New Taipei (TW)

(72) Inventors: Jen Li Liao, New Taipei (TW); Yu Seng Liao, New Taipei (TW); Wen Hua Liao Hu, New Taipei (TW); Hsuan Hsien Liao, New Taipei (TW); Fang Ying Liao, New Taipei (TW)

(*) Notice: Subject to any disclaimer, the term of this patent is extended or adjusted under 35 U.S.C. 154(b) by 327 days.

(21) Appl. No.: 15/012,277

(22) Filed: Feb. 1, 2016

(65) Prior Publication Data

US 2016/0236578 A1    Aug. 18, 2016

(30) Foreign Application Priority Data

Feb. 13, 2015 (TW) .............................. 104105022 A

(51) Int. Cl.
| H02J 7/00 | (2006.01) |
| B60L 11/18 | (2006.01) |
| B60K 25/08 | (2006.01) |
| B60L 11/00 | (2006.01) |
| F03G 7/08 | (2006.01) |
| B60K 25/10 | (2006.01) |

(52) U.S. Cl.
CPC ............ B60L 11/185 (2013.01); B60K 25/08 (2013.01); B60L 11/002 (2013.01); B60L 11/1816 (2013.01); B60L 11/1861 (2013.01); B60L 11/1877 (2013.01); B60L 11/1881 (2013.01); F03G 7/08 (2013.01); *B60K 2025/103* (2013.01); *Y02T 10/705* (2013.01); *Y02T 10/7044* (2013.01); *Y02T 90/34* (2013.01)

(58) Field of Classification Search
CPC .................................................. B60L 11/1844
USPC ......................................................... 320/126
See application file for complete search history.

(56) References Cited

U.S. PATENT DOCUMENTS

| 2012/0262110 A1 | 10/2012 | Soong et al. | |
| 2013/0249317 A1* | 9/2013 | Kang | ................. G01R 31/3658 307/116 |
| 2014/0167657 A1* | 6/2014 | Nishikawa | .......... H01M 10/441 318/139 |

* cited by examiner

*Primary Examiner* — Edward Tso
*Assistant Examiner* — Ahmed Omar
(74) *Attorney, Agent, or Firm* — Muncy, Geissler, Olds & Lowe, P.C.

(57) ABSTRACT

An automobile quick charge control device include: an electric vehicle body, having a power generator; a power storage module, installed at the electric vehicle body and electrically connected to the power generator, and having batteries connected parallel to each other and having battery units and node switches respectively; a battery management system, electrically connected to the power storage module and the power generator, and the battery management system being electrically connected to the batteries and each node switch of the battery; a vehicle controller, electrically connected to the power storage module, the power generator and the battery management system, for reading information of the battery management system and monitoring the power storage module, and controlling the charge/discharge between the batteries. With the design of batteries and the operation of related control systems, a quick external charge for electric cars is achieved.

14 Claims, 10 Drawing Sheets

AUTOMOBILE QUICK CHARGE CONTROL DEVICE

TECHNICAL FIELD

The technical field relates to a charge device, and more particularly to an electric car charge control device capable of charging a power storage device of a vehicle body quickly and controlling an electric device to keep performing a charge operation effectively, so as to provide an application with high stability high performance.

BACKGROUND

Motor vehicle is a common transportation means, and the subjects of oil depletion, carbon reduction, and green energy application make the development of electric cars to be a main current and future trend. Since electric cars do not have the issues of air pollution and environmental noise, they are transportation means in compliance with the requirements of environmental protection.

The technology of charging and controlling electric cars is an important key to the development of the electric car industry. Although electric cars may adopt a power generation device to convert kinetic power into electric power to charge the electric cars during the operation of the electric cars, a relatively large electric power is required at the stage of starting the electric cars and driving the electric cars at an early stage after starting the cars. Obviously, a large power supply is required for the overall power supply and charge operation to achieve a smooth operation. However, the conventional electric car and external power generator take much time for the charge, and the mobility is far inferior to fuel vehicles. Therefore, the efficiency of charging electric cars must be improved effectively for a quick development of the electric car industry. In addition, the power generator of a conventional electric car converts kinetic energy into electric energy and charges a power storage device during the operation of the electric car, but the technologies for controlling the overall charge including the prevention of overcharge, over-discharge, over-current, and overheat as well as the charge sequence and performance are still immature. Therefore, it is an important breakthrough for related manufacturers to overcome and improve the drawbacks on the charging performance and operation control of the conventional electric cars.

In view of the drawbacks of the prior art, the discloser of this disclosure based on years of experience in the related industry to conduct extensive researches and experiments, and finally provided a feasible solution and developed an automobile quick charge control device in accordance with this disclosure to overcome the drawbacks of the prior art.

SUMMARY

Therefore, it is a primary objective of this disclosure to provide an automobile quick charge control device with a battery design and a related control system of an external quick charge for charging an electric car conveniently.

Another objective of this disclosure is to provide a design of a power storage module (including a battery assembly and a power storage module) and a related control system which is combined with a vehicle body for converting kinetic energy into electric energy stably while the vehicle body is moving forward, and maintains an excellent charge efficiency after the electric car starts moving, so as to achieve a convenient charge operation, smooth management, and high performance.

To achieve the aforementioned objectives and effects, this disclosure adopts a method and provides an automobile quick charge control device, comprising: an electric vehicle body, comprising a power generator; a power storage module, installed at the electric vehicle body, and electrically coupled to the power generator, and having at least a first battery assembly and a second battery assembly coupled in parallel with each other, and the first battery assembly and the second battery assembly having a plurality of battery units and a plurality of node switches respectively, and each battery unit being formed by coupling a plurality of batteries in series with one each; a battery management system, electrically coupled to the power storage module and the power generator, and also electrically coupled to each node switch of the first battery assembly and the second battery assembly; and a vehicle controller, electrically coupled to the power storage module, the power generator and the battery management system, for reading information of the battery management system and monitoring the power storage module, and controlling the switch of charge/discharge of the first battery assembly and the second battery assembly.

In the aforementioned device, the node switch is installed between the adjacent battery units, and both ends of the first battery assembly and the second battery assembly are coupled to the node switches respectively.

In the aforementioned device, the node switch between the battery units corresponsive to the first battery assembly and the second battery assembly coupled in parallel with each other are electrically coupled to each other by a circuit wiring.

In the aforementioned device, the vehicle controller is electrically coupled to each node switch of the first battery assembly and the second battery assembly.

In the aforementioned device, the vehicle controller is electrically coupled to an external charger, and the charger has a plurality of charging connectors corresponsive to the power storage module, and the charging connectors are coupled to the node switches at both ends of the first battery assembly and the second battery assembly.

In the aforementioned device, the first battery assembly has 168 pieces of 40 Ah batteries coupled in series with each other, and each battery has a voltage of 3.6 volts, so that the first battery assembly is capable of generating 24 KW power during a charge process of an hour, and the second battery assembly has the same structure and is capable of generating 48 KW power during a charge process of an hour.

In the aforementioned device, the node switch is a programmable current switch for charging the battery units of the first battery assembly and the second battery assembly one by one.

The automobile quick charge control device comprises a transformer with an end electrically coupled to a Mains power and the other end electrically coupled to the vehicle controller, and the transformer is also electrically coupled to each node switch of the first battery assembly and the second battery assembly, and the transformer converts AC of the Mains power into DC, and converts the DC into a plurality of currents, and the vehicle controller controls each node switch to ON, and allows each battery unit of the first battery assembly and each battery unit of second battery assembly to charge simultaneously by the currents.

In the aforementioned device, the electric vehicle body includes at least one roller, and the roller is a rotational rolling member pressing on the ground, and the roller is linked to a pushrod, and the pushrod is further linked to a link rod, and the link rod keeps displacing reciprocally and actuates at the power generator to drive the power generator to generate electric power.

In the aforementioned device, the roller has more than one equidistant protrusions at the periphery of the roller.

The aforementioned electric vehicle body comprises: at least one roller, pivotally coupled to a hub of the vehicle body, and touching the ground when the roller is rolling, and the roller having at least one groove; at least one push slider, installed in the groove, and having at least one pushrod, and an end of the push slider in contact with the ground having an arc bottom, and the pushrod being abutted by a spring to protrude in a direction towards the outer side of the roller; at least one power generator, installed at an opposite pushing position of the pushrod, and electrically coupled to the power storage module; thereby, when the vehicle body travels, the roller is driven to roll, and the push slider presses the ground and slides and retracts to transmit kinetic energy to the power generator, and then the power generator converts the kinetic energy into electric energy and stores the electric energy in the power storage module.

In the aforementioned device, the spring is positioned and abutted against the groove to push the pushrod, and the pushrod has a ball bearing passed and installed in the groove.

In the aforementioned device, the pushrod has an arc top opposite to the other end of the arc bottom, and the arc top has an arc sliding surface.

In the aforementioned device, the groove has a side slot formed on both sides of the groove separately, and both sides of the push slider are coupled to a side slider separately, and the side slider is coupled to an edge of the arc bottom, and the side slider slides with respect to the side slot, and the side sliders have at least one ball bearing passed and installed in the side slot.

In the aforementioned device, when the first battery assembly supplies electric power to a power consuming device of a car, and the electric power is consumed to a remained power level of 10%~20%, the vehicle controller pauses supplying power to the first battery assembly, and lets the second battery assembly take over the power supply, and all power generation devices charge the first battery assembly until the first battery assembly is fully charged, and when the second battery assembly takes over the power supply, and the electric power is consumed to a remained power level of 10%~20%, the vehicle controller pauses supplying power to the second battery assembly and lets the first battery assembly take over the power supply again, and the power generation device charges the first battery assembly and the second battery assembly alternately.

This disclosure will become clearer in light of the following detailed description of an illustrative embodiment of this invention described in connection with the drawings.

DESCRIPTION OF THE PREFERRED EMBODIMENTS

Figure 1:
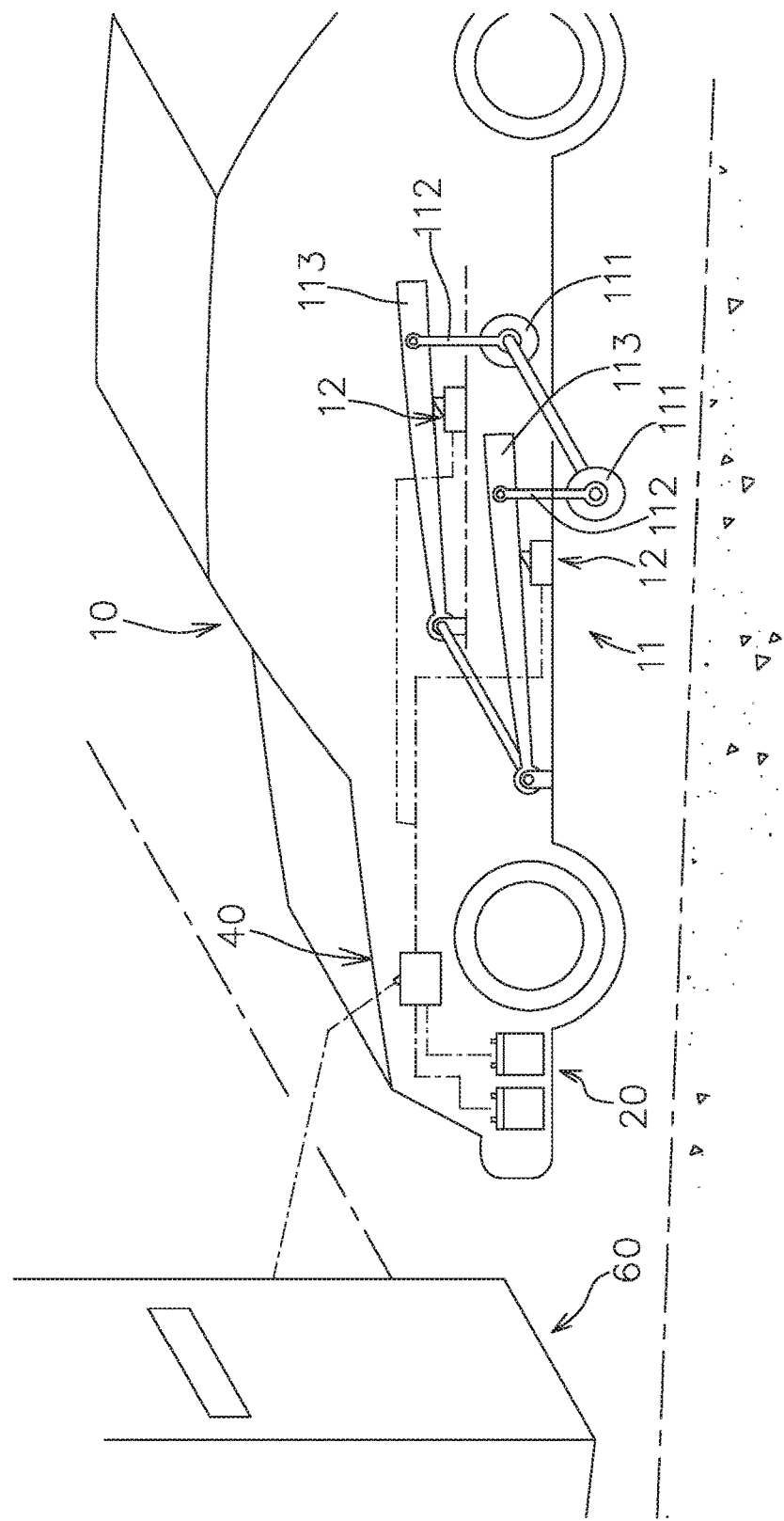
FIG. 1 is a schematic view of an external charge application of this disclosure.
Figure 2:
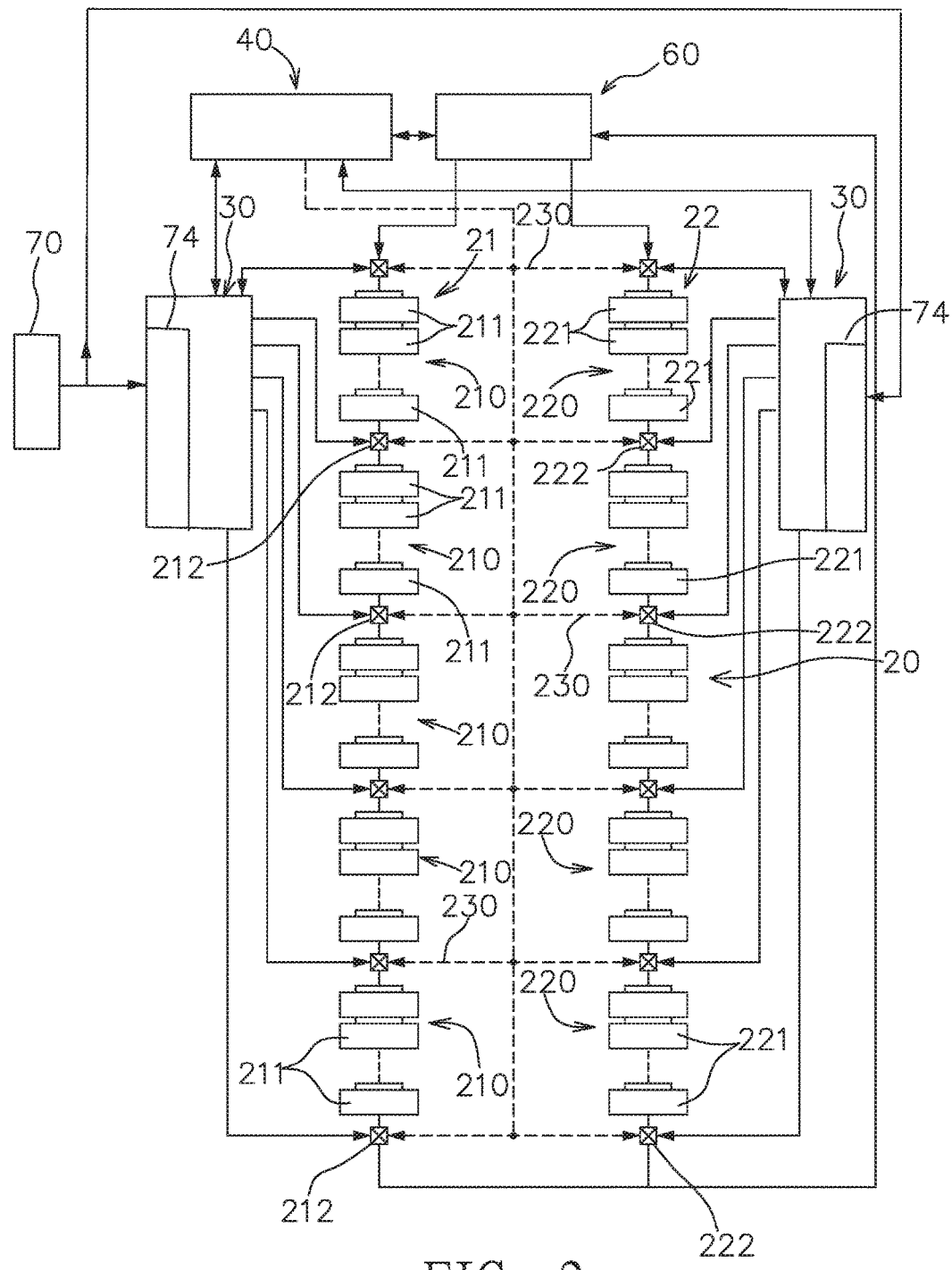
FIG. 2 is a schematic view showing the charging process of this disclosure.
Figure 3:
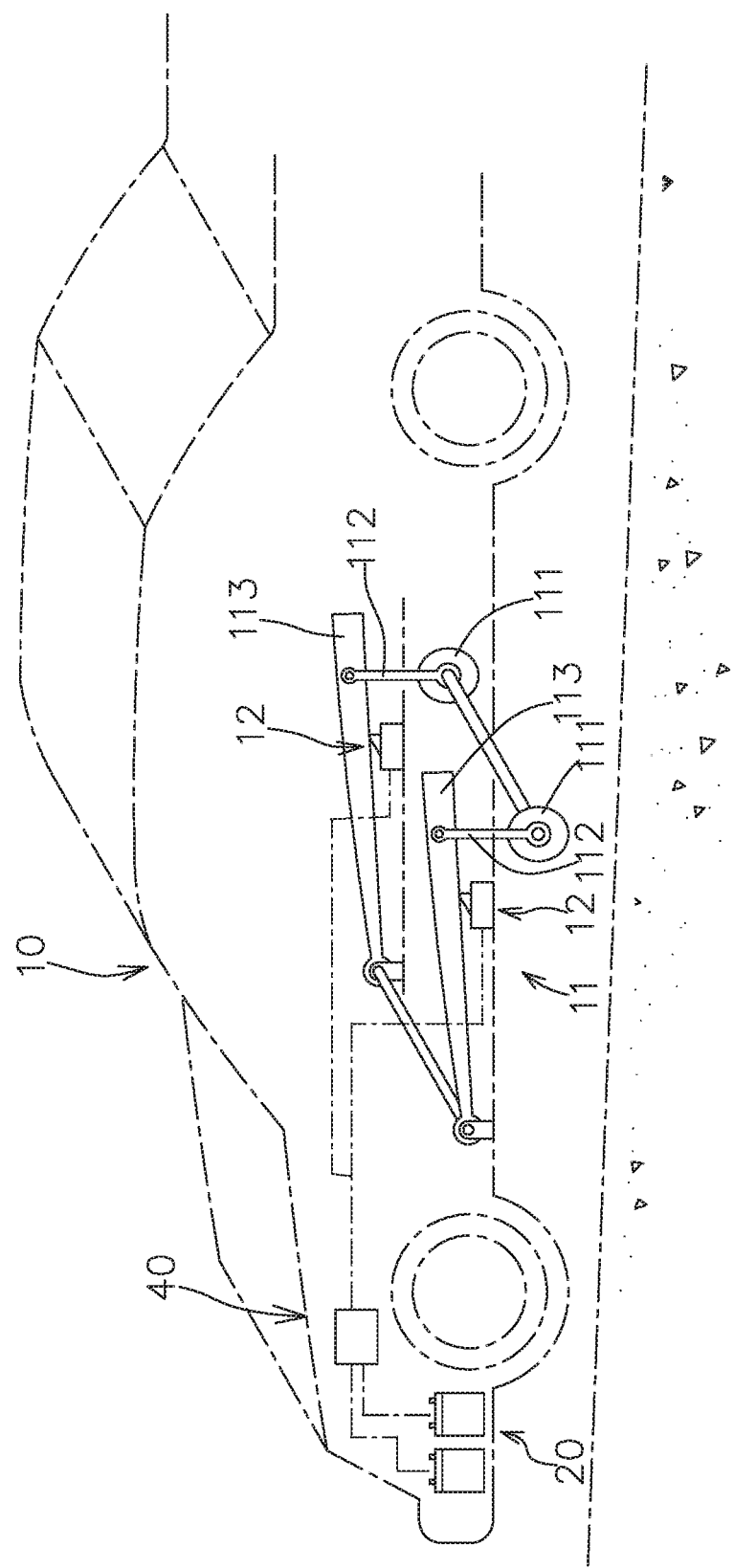
FIG. 3 is a schematic view showing the structure of this disclosure.

With reference to FIGS. 1 to 3 for an automobile quick charge control device in accordance with an embodiment of this disclosure, the automobile quick charge control device is applicable to a vehicle body with a rotating shaft or a wheel, and the automobile quick charge control device of this embodiment is installed onto an electric vehicle body 10 which is the aforementioned vehicle body, and the electric vehicle body 10 comprises a power generation device 11, including at least one roller 111 which is a rotational rolling member in contact with the ground, and the roller 111 is linked to a pushrod 112, so that the roller may be displaced continuously and reciprocally up and down (or in other directions), and the pushrod 112 is further linked to a link rod 113, so that the link rod 113 also keeps moving reciprocally, and the link rod 113 is actuated at a power generator 12 to drive the power generator 12 to generate electric power.

In this embodiment, the automobile quick charge control device comprises a power storage module 20, a battery management system 30 and a vehicle controller 40; wherein the power storage module 20 is installed at the electric vehicle body 10 and electrically coupled to the power generator 12; the power storage module 20 includes a first battery assembly 21 and second battery assembly 22 coupled in parallel with each other, and the first battery assembly 21 includes a plurality of battery units 210 and a plurality of node switches 212, and the battery unit 210 is formed by connecting a plurality of batteries 211 in series with each other, and the node switch 212 is installed at both ends of each battery unit 210 and acts a charging node of the power generator 12. In other words, the node switch 212 is installed between two adjacent battery units 210, and both ends of the first battery assembly 21 have a node switch 212. Similarly, the second battery assembly 22 includes a plurality of battery units 220 and a plurality of node switches 222, and the battery unit 220 is formed by connecting a plurality of batteries 221 in series with each other, and the node switch 222 is installed at both ends of each battery unit 220 and acts as a charging node of a charger 60 (as shown in FIG. 1), and the node switch 222 is installed between two adjacent battery units 220, and both ends of the second battery assembly 22 are coupled to a node switch 222. In addition, the node switches 212, 222 of the battery units 210, 220 corresponsive to the first battery assembly 21 and the second battery assembly 22 coupled in parallel with each other are electrically coupled to each other by a circuit wiring 230 as shown in FIG. 2, and the battery management system 30 (BMS) is electrically coupled to the power storage module 20. Preferably, the battery management system 30 is electrically coupled to each node switch 212, 222 of the first battery assembly 21 and the second battery assembly 22 by the circuit wiring 230. The battery management system 30 is electrically coupled to the vehicle controller 40 and the power generator 12 or a charger 60; the battery management system 30 (BMS) may examine the voltage, current, and temperature of the power storage module 20 and also may perform electric leakage inspection, thermal management, battery balance management, alarm, remained power calculation, discharge, and state of charge (SOC) and state of health (SOH) inspection, and control the maximum output power and the optimal current charge according to the voltage, current, and temperature of battery by using an algorithm. The charger 60 or the power generator 12 is a power device for supplying power to (or charging) the electric vehicle body 10.

The vehicle controller 40 is electrically coupled to the power storage module 20, and also electrically coupled to each node switch 212, 222 of the first battery assembly 21 and the second battery assembly 22 by the circuit wiring 230. The vehicle controller 40 is also electrically coupled to the charger 60 and the battery management system 30 (BMS) for charging after the internal power generator 12 generates power, or electrically coupled to an external charger 60 (DC) for charging an internal device, or electrically coupled to an external Mains power 70 for charging an internal device quickly. The vehicle controller 40 monitors and controls general driving information as well as reading information of the battery management system 30 (BMS) and monitoring the status of the power storage module 20 and serves as a basis for switching the charge/discharge of the first battery assembly 21 and the second battery assembly 22.

Since the conventional electric car and the external power generator take much time for the charging process (and usually take several hour to fully charge a battery which constitutes an obstacle to the promotion of electric cars), therefore, this disclosure provides a special charging technique and design to achieve a quick charge effect, and related data are given below:

The first battery assembly 21 (or the second battery assembly 22) includes 168 pieces of 40 Ah batteries 211 which are coupled in series with each other, and the voltage of each battery 211 is 3.6 volts, so that the total voltage is 3.6×168=600 volts.

Since Power (P)=Current (I)×Voltage (V)=40×600=24,000 Watt=24 KW, therefore the first battery assembly 21 generates a power of 24 KW in an hour and two battery assemblies generate a power of 48 KW in an hour.

In addition, the specification of the external charger 60 has no particular limitations. In this embodiment, an independent large power DC charger is adopted, and the charger 60 may be a three-phase 220 VDC 50 KW charger, or a 700 VDC charger, and the charger 60 has two charging connectors (not shown in the figure) electrically coupled to the first battery assembly 21 (or the node switch 212 of an inlet) and the second battery assembly 22 (or the node switch 222 of an inlet) for charging, and the two battery assemblies (including the first battery assembly 21 and the second battery assembly 22) are fully charged in an hour. In other words, the automobile quick charge control device of this disclosure is capable of supplying an electric power of 48 KW for starting an electric car or supplying power for the operation of the car at an early stage after starting the car. This disclosure provides an excellent charging efficiency and convenient use of the electric car.

After the electric vehicle body 10 is driving, the power generation device 11 (or the power generator 12) is turned on to generate power and charge the power storage module 20 simultaneously. With the design of the node switch 212, 222 being a programmable current switch, and each node switch 212, 222 of the power generator 12 being electrically coupled to the first battery assembly 21 and the second battery assembly 22 and the control of the vehicle controller 40, the first battery assembly 21 and the second battery assembly 22 are provided for charging or switched when the power generator 12 charges the power storage module 20, so that after a battery unit 210 of the first battery assembly 21 (or the second battery assembly 22) is fully charged, and the next battery unit 210 can be charged, and finally the whole first battery assembly 21 can be charged through the control of the node switch 212, 222, and the vehicle controller 40 is controlled and switched to charge the battery units 220 of the second battery assembly 22 one by one until the whole second battery assembly 22 is fully charged. The automobile quick charge control device provides a high performance charge operation and improves the charging efficiency In addition, the power generation device 11 of this disclosure may use a Mains power 70 to charge the first battery assembly 21 and the second battery assembly 22 quickly. In FIG. 2, the Mains power 70 (such as the Mains power of 220 volts) is electrically coupled to a transformer 74, and the transformer 74 is electrically coupled to the vehicle controller 40, and the transformer 74 is also electrically coupled to each node switch 212, 222 of the first battery assembly 21 and the second battery assembly 22, and the transformer 74 is provided for converting AC of the Mains power into DC, and converting the DC into a plurality of currents. Each node switch 212, 222 is turned on by the vehicle controller 40, so that each battery unit 210 of the first battery assembly 21 and each battery unit 210 of the second battery assembly 22 is capable of charging simultaneously by the current, so as to expedite the charging process significantly. According to test results, such quick charge control device can fully charge the first battery assembly 21 and the second battery assembly 22 in an hour and provide a high performance for the charge operation. In this embodiment, the transformer 74 is installed in the battery management system 30. In another embodiment, the transformer 74 is not installed in the battery management system 30.

With reference to FIG. 2 for an application of switching the charging between two batteries of a power generation device 11 of this disclosure, the charging method is described below. When the first battery assembly 21 supplies power to a power consuming device of a car such as a motor, an automobile air-conditioner, a car lamp, a computer, a controller, or an alarm and the power is consumed to a remained power level of 10%~20%, the vehicle controller 40 drives the first battery assembly 21 to pause the power supply and lets the second battery assembly 22 to take over the power supply. Now, all power generation devices 11 of this disclosure will charge the first battery assembly 21 until the first battery assembly 21 is fully charged, and when the second battery assembly 22 takes over the power supply and the power is consumed to a remained power level of 10%~20%, the vehicle controller 40 drives the second battery assembly 22 to pause the power supply and lets the first battery assembly 21 take over the power again, so that the power generation device 11 can switch the charges between the first battery assembly 21 and the second battery assembly 22.

Figure 4:
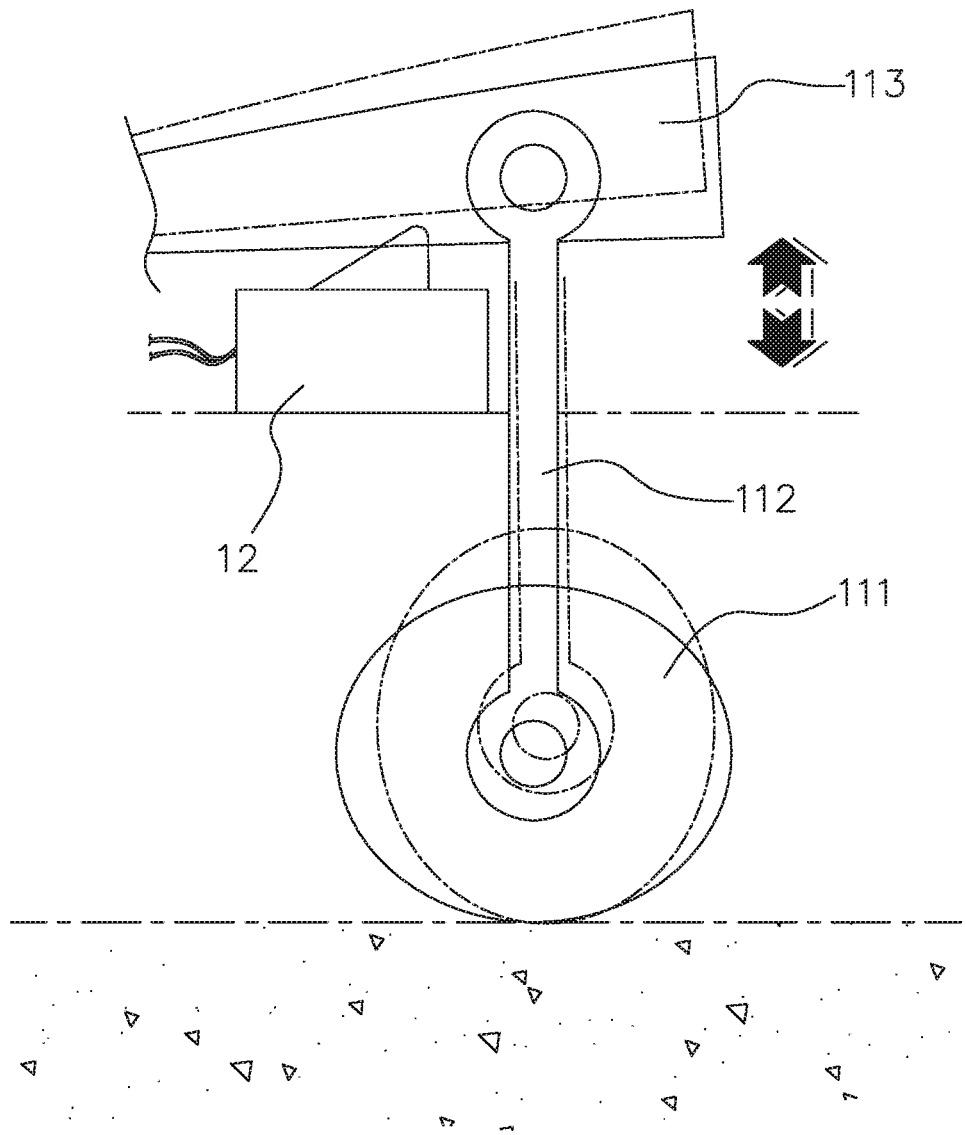
FIG. 4 is a first schematic view of a power generation device in accordance with an embodiment of this disclosure.
Figure 5:
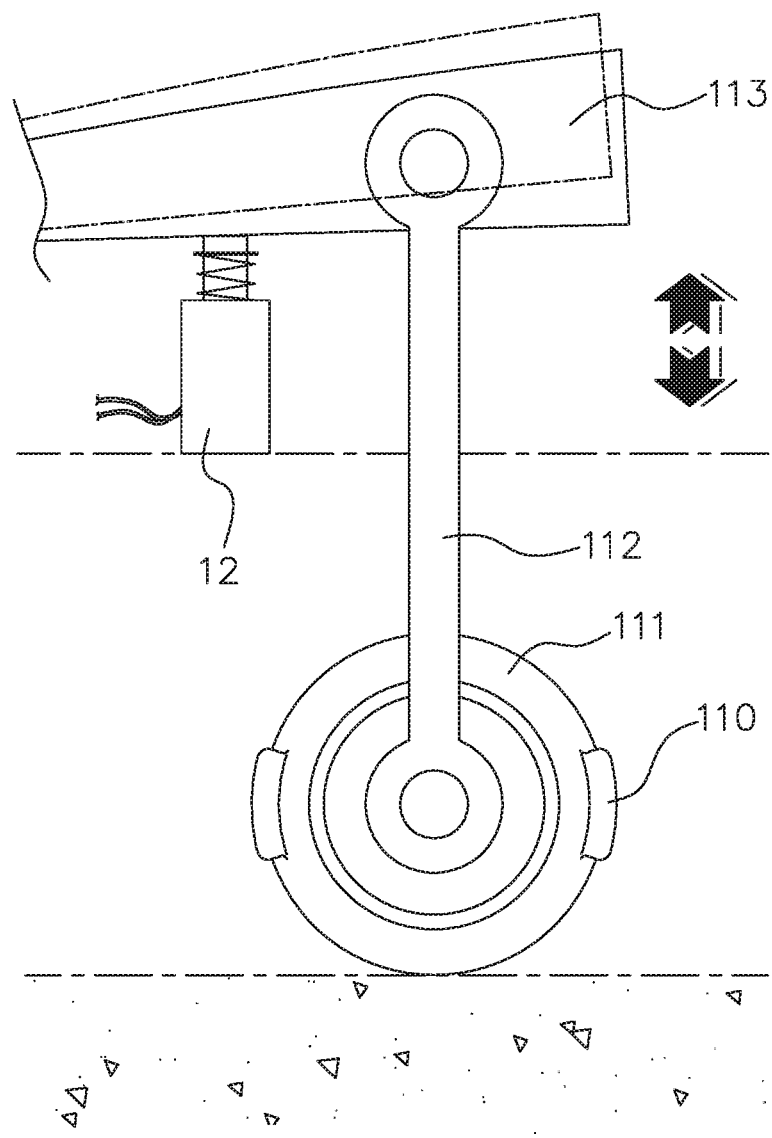
FIG. 5 is a second schematic view of a power generation device in accordance with the embodiment of this disclosure.
Figure 6:
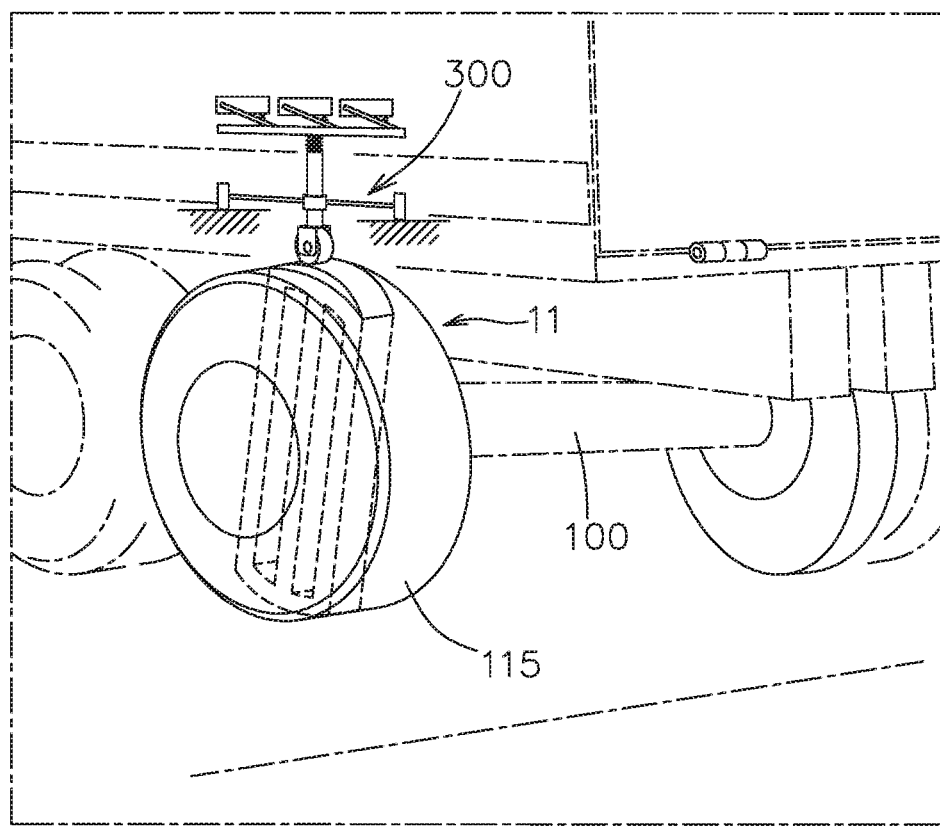
FIG. 6 is a first schematic view of a power generation device in accordance with another embodiment of this disclosure.
Figure 7:
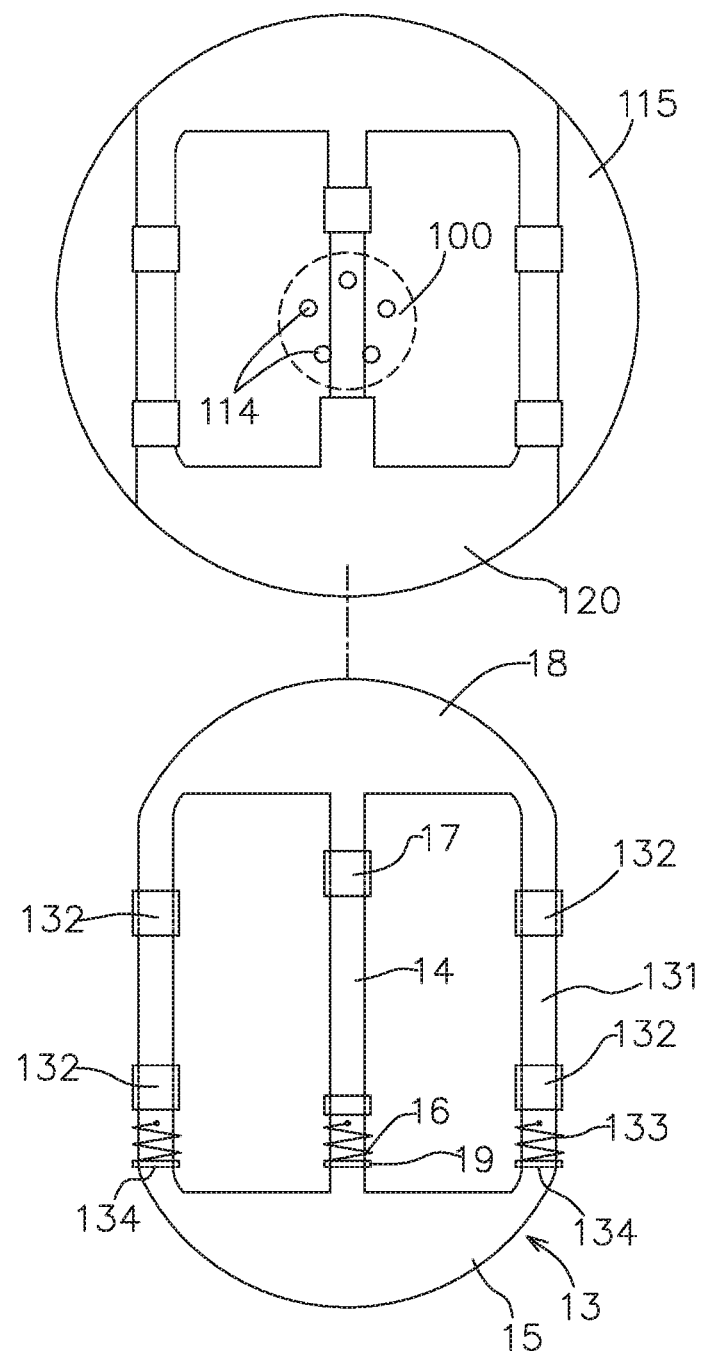
FIG. 7 is an exploded view of a push slider in accordance with the other embodiment of this disclosure.

With reference to FIGS. 4 and 5 for different implementation modes of the power generation device 11 of this disclosure respectively, the link rods 113 and the pushrods 112 are fixed by a fixing member, and the fixing member may be a screw or a rivet. The roller 111 moving up and down while rolling further includes more than one equidistant protrusions 110 formed at the periphery of the roller 111 (as shown in FIG. 5), and the protrusions 110 have not covered the whole periphery of the roller 111. In this embodiment, the protrusions 110 are disposed at ½ of the circumference of the roller 111, and the rollers 111 press on the ground while the car is moving. Therefore, the moving car drives the roller 111 to roll, and when the protrusions 110 touch the ground, the link rod 113 will jump up. On the other hand, when none of the protrusions 110 of the roller 111 touches the ground, the link rod 113 will presses and abuts the power generator 12, so that the link rod 113 will jump up and down. When the link rod 113 jumps down, the kinetic energy is transmitted to the power generator 12, and the power generator 12 converts the kinetic energy into electric energy and stores the electric energy into the power storage module 20, and the repeated operations will produce dynamic potential, and the dynamic potential is further converted into electric energy which is stored in the power storage module 20. The power generator 12 may be a pedal power generator, a linear power generator, a touch control power generator, or a hydraulic power generator, and the power generators 12 are coupled to the power storage module 20. In this embodiment, the power storage module 20 is installed under the front hood (or any other appropriate position of the car), and the battery 211, 221 of this embodiment is a Li—Fe battery.

With reference to FIGS. 6 to 10 for a power generation device 11 of another embodiment of this disclosure, the power generation device 11 is installed at a hub 100 under the vehicle body, and the power generation device 11 comprises at least one roller 115, a push slider 13 and a power generator 300. The roller 115 is pivotally coupled to the hub 100 through the positioning hole 114, and the roller 115 may be a rolling member outside the wheels and may touch, roll and rotate with respect to the ground. The roller 115 has at least one groove 120 which is a groove with 3~10 cm sunken into the roller 115, and provided for installing the push slider 13, wherein the push slider 13 is a rod, plate, or a combination of the two, and the push slider 13 has at least one pushrod 14, and the bottom of the push slider 13 (which is an end touching the ground) is an arc bottom 15 protruding sideway, and a spring 16 is sheathed on the pushrod 14, and the top of the spring 16 is positioned and abutted at the groove 120, and the bottom of the spring 16 is abutted at the pushrod 14. For example, the pushrod 14 has an abutting ring 19 disposed at the bottom of the spring 16, so that the pushrod 14 has an elastic force pressing towards an outer side. In other words, the pushrod 14 is pressed by the spring 16 to protrude in a direction towards an outer side of the roller 115, and a ball bearing 17 is passed and installed to the pushrod 14. In other words, the ball bearing 17 is installed at an appropriate position in the groove 120 to allow the pushrod 14 to slide in the groove 120 smoothly, and the groove 120 has a shape corresponsive to the shape of the push slider 13 and a size slightly greater than the push slider 13, so that the push slider 13 cam slide in the groove 120. When the push slider 13 slides towards the outer side, the arc bottom 15 is exposed from the roller 115, and when the push slider 13 is pressed by the ground to slide towards the inner side, the arc bottom 15 slides towards the roller 115. The material and size of the arc bottom 15 are not limited, and the arc bottom 15 of this embodiment is made of steel and has a width approximately equal to 3~5 cm. In addition, the power generator 300 is installed at the top of the pushrod 14 when touching the ground and electrically coupled to the power storage module 20.

Figure 9:
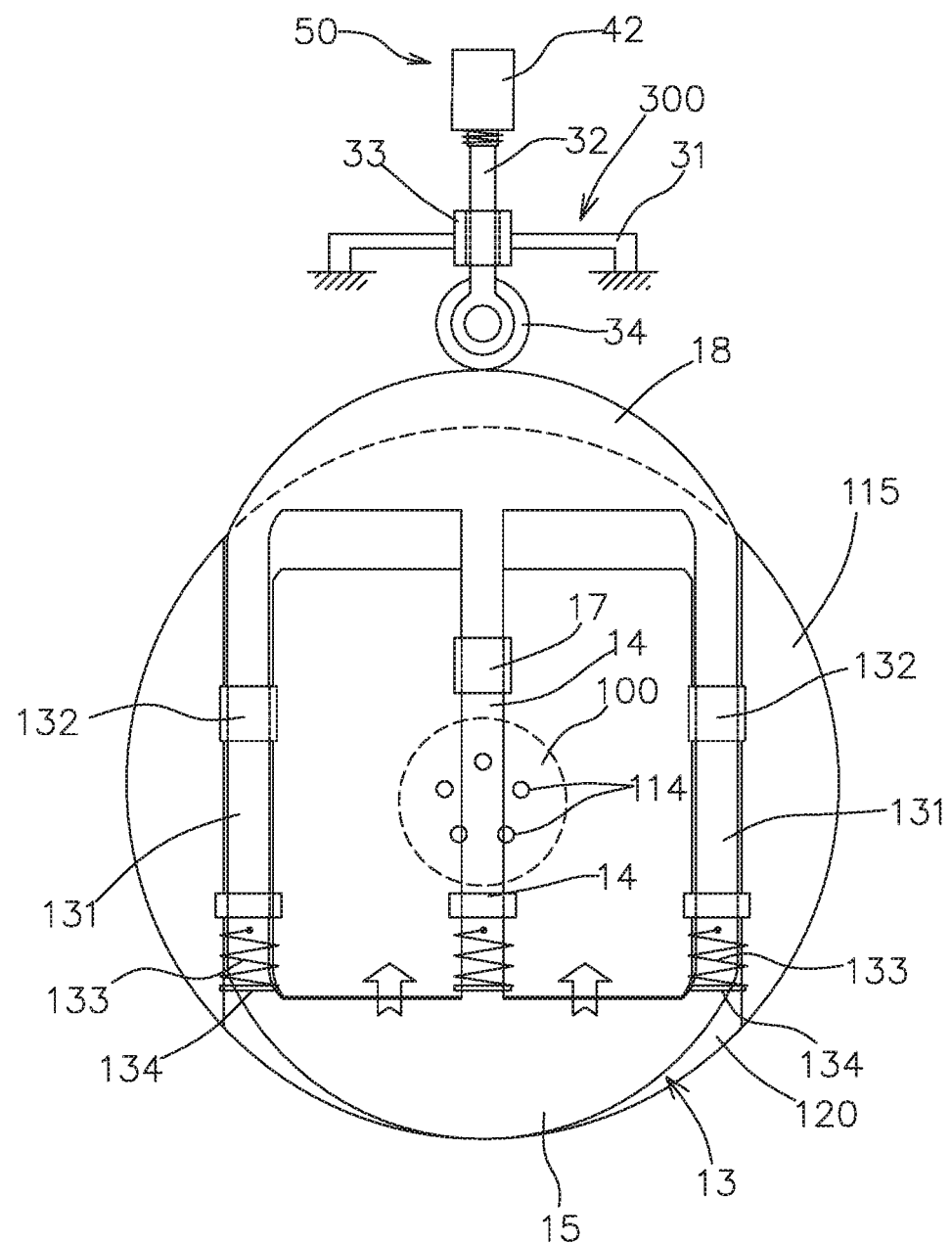
FIG. 9 is a second schematic view of an operation status of a power generation device in accordance with the further embodiment of this disclosure.

During the operation of the power generation device 11 of this disclosure, the moving car will drive the roller 115 to roll, and the arc bottom 15 of the roller 115 exposed from the roller 115 will press the ground, and the pressure of the ground drives the arc bottom 15 to slide into the roller 115. Now, the push slider 13 slides upward in the groove 120, so that the pushrod 14 of the push slider 13 also slides upward to transmit the kinetic energy of the pushrod 14 to the power generator 300, and the power generator 300 converts the kinetic energy into electric energy and stores the electric energy in the power storage module 20. When the pushrod 14 of the push slider 13 slides upward, the spring 16 is pressed by the abutting ring 19 to generate a restoring resilience (as shown in FIG. 9), so that when the car continues moving forward, the roller 115 is rolled forward to separate the arc bottom 15 from the ground, and the arc bottom 15 is acted by the elastic force of the spring 16 and exposed from the roller 115. Until the next time (after rotating for a round) and the arc bottom 15 presses the ground again, the pushrod 14 (or the push slider 13) will push the power generator 300 to generate power. Therefore, the repeated operations of converting kinetic energy into electric energy, the electric energy is stored in the power storage module 20.

In an appropriate implementation mode, the top of the pushrod 14 of the push slider 13 (opposite to the other end of the arc bottom 15) is an arc top 18, and the arc top 18 may be a meniscus end having an arc sliding surface, so that the arc sliding surface of the arc top 18 allows the pushrod 14 to transmit the kinetic energy to the power generator 300 smoothly.

In addition, both sides of the groove 120 further have a side slot 121, and both sides of the push slider 13 are further coupled to a side slider 131, and the side slider 131 may be a rod or a plate, and the side slider 131 is integrally coupled to an edge of the arc bottom 15. In other words, the side slider 131 is extended from an edge of the arc bottom 15 to the interior of the roller 115 and slides in the side slot 121, so as to slide the push slider 13 more stably. In addition, the side sliders 131 on both sides of the push slider 13 are integrally coupled to the arc top 18. In other words, the side sliders 131 are integrally coupled between the arc bottom 15 and the arc top 18, so that the push slider 13, the arc bottom 15 and the arc top 18 constitute an integrally coupled ring body. In addition, same as the positioning assembly of the pushrod 14 (or the push slider 13), the side slider 131 has a ball bearing 132 and a spring 133 abutted by an abutting ring 134, and the ball bearing 132 may be positioned in the side slot 121, so that the side sliders 131 can slide more smoothly.

In an appropriate implementation method, the functions of the arc top 18 and the arc bottom 15 may be switched, since their shape is very similar. In other words, the arc top 18 may be used for pressing the arc bottom 15 to the ground in order to slide the push slider 13 upwardly in the groove 120 and transmit the kinetic energy of the pushrod 14 to the power generator 300, and the power generator 300 converts the kinetic energy into electric energy and stores the electric energy in the power storage module 20. During the operation of the power generation device 11 of this disclosure, when the roller 115 rolls a round, the kinetic energy is converted into electric energy for several times, so as to increase the amount of generated power.

Figure 8:
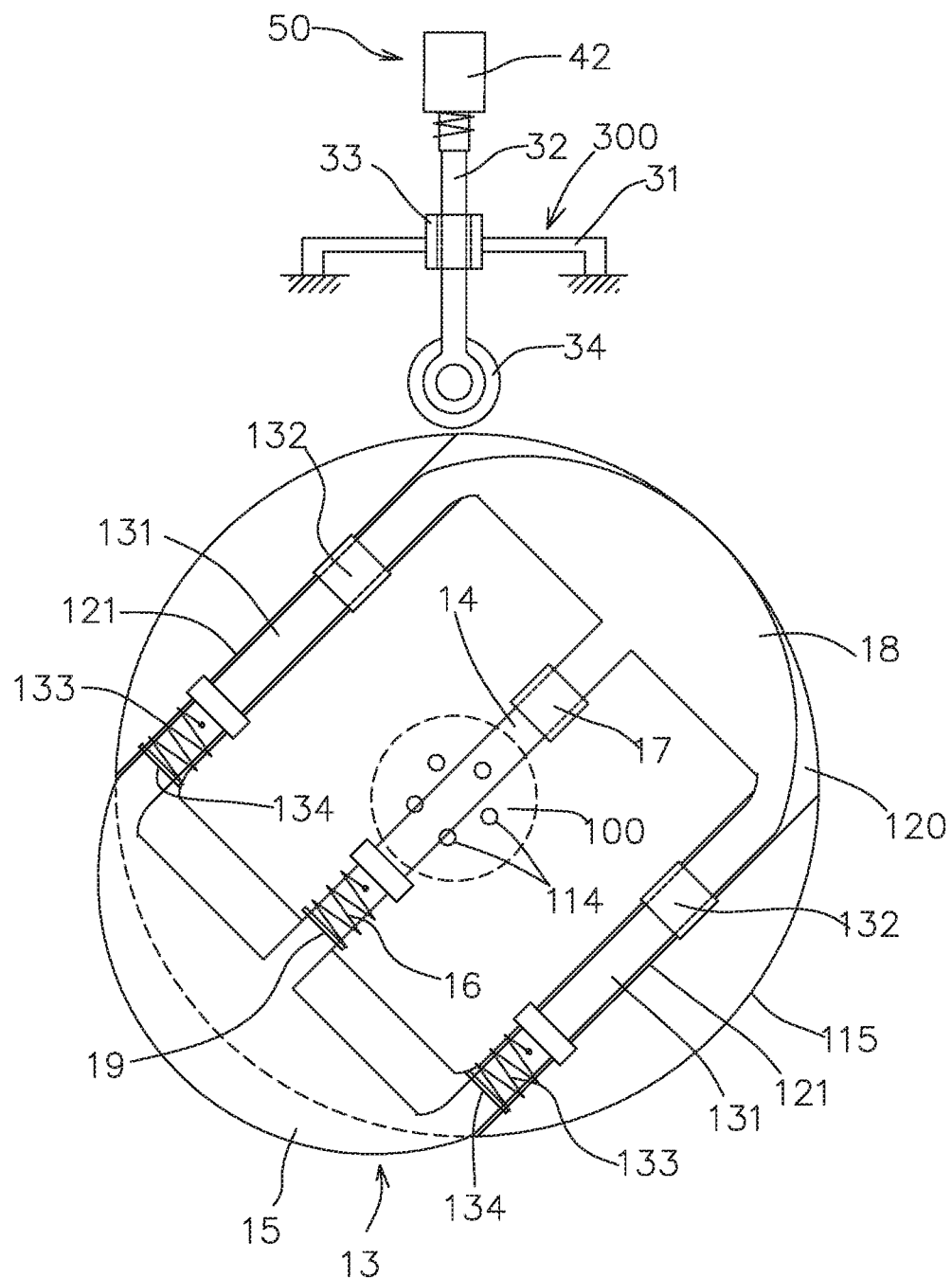
FIG. 8 is a first schematic view of an operation status of a power generation device in accordance with a further embodiment of this disclosure.
Figure 10:
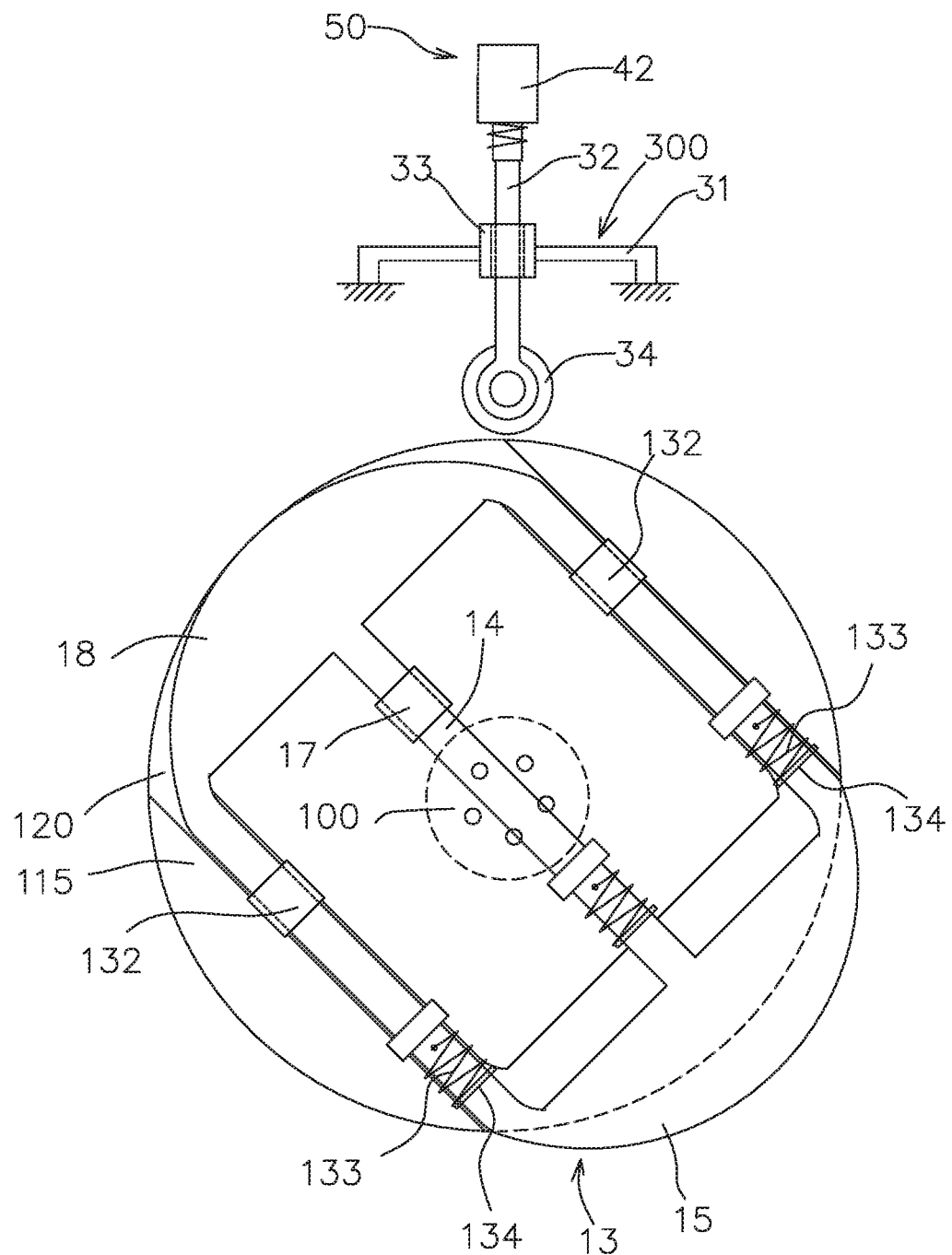
FIG. 10 is a third schematic view of an operation status of a power generation device in accordance with the further embodiment of this disclosure.

With reference to FIGS. 8 to 10, the power generator 300 further comprises: a mounting bracket 31, installed and fixed to an appropriate position of the vehicle body; a link rod 32, having a ball bearing 33 passed and installed thereon and positioned at the mounting bracket 31, and an elastic pulley 34 pivotally coupled to a lower end of the link rod 32; a kinetic energy conversion mechanism 50 (which is a linear power generator 42 as shown in the figure), installed at a position corresponsive to the moving direction of the link rod 32 (such as the top). With reference to FIGS. 8 to 10 for the relation between the roller 115, the pushrod 14 of the push slider 13, and the power generator 300 when the power generation device 11 of this disclosure is operated and rotated for a round, if the pushrod 14 of the push slider 13 slides upward, the kinetic energy is transmitted to the elastic pulley 34 of the link rod 32 of the power generator 300, so that the link rod 32 slides upward to transmit the kinetic energy to the kinetic energy conversion mechanism 50/linear power generator 42 (as shown in FIG. 9), and the kinetic energy conversion mechanism 50 converts the kinetic energy into electric energy and stores the electric energy in the battery. Therefore, the kinetic energy is converted into electric energy repeatedly and stored in the power storage module 20. With the installation of the elastic pulley 34 of the power generator 300, the sideway vibrations occurred when the link rod 32 slides upward to transmit the kinetic energy to the kinetic energy conversion mechanism 50 can be absorbed to let the link rod 32 slide upward more smoothly.

In summation of the description above, the automobile quick charge control device of this disclosure with the battery design and the related control system operation provides a quick external charging effect to electric cars and promotes the development of electric cars. In the meantime, this disclosure combined with a vehicle body can fully utilize and convert the kinetic energy produced by the moving vehicle body into electric energy, so that the electric car has excellent charge efficiency, and this disclosure provides a convenient operation, a smooth management, and a high performance for charging electric cars.

While this disclosure has been described by means of specific embodiments, numerous modifications and variations could be made thereto by those skilled in the art without departing from the scope and spirit of this disclosure set forth in the claims.

What is claimed is:

1. An automobile quick charge control device, comprising:
    an electric vehicle body, comprising a power generator;
    a power storage module, installed at the electric vehicle body, and electrically coupled to the power generator, and having at least a first battery assembly and a second battery assembly coupled in parallel with each other, and the first battery assembly and the second battery assembly having a plurality of battery units and a plurality of node switches respectively, and each battery unit being formed by coupling a plurality of batteries in series with one each;
    a battery management system, electrically coupled to the power storage module and the power generator, and also electrically coupled to each node switch of the first battery assembly and the second battery assembly; and
    a vehicle controller, electrically coupled to the power storage module, the power generator and the battery management system, for reading information of the battery management system and monitoring the power storage module, and controlling the switch of charge/discharge of the first battery assembly and the second battery assembly;
    wherein the node switch is installed between the adjacent battery units, and both ends of the first battery assembly and the second battery assembly are coupled to the node switches respectively.

2. The automobile quick charge control device according to claim 1, wherein the node switch between the battery units corresponsive to the first battery assembly and the second battery assembly coupled in parallel with each other are electrically coupled to each other by a circuit wiring.

3. The automobile quick charge control device according to claim 2, wherein the vehicle controller is electrically coupled to each node switch of the first battery assembly and the second battery assembly.

4. The automobile quick charge control device according to claim 3, wherein the vehicle controller is electrically coupled to an external charger, and the charger has a plurality of charging connectors corresponsive to the power storage module, and the charging connectors are coupled to the node switches at both ends of the first battery assembly and the second battery assembly.

5. The automobile quick charge control device according to claim 4, wherein the first battery assembly has 168 pieces of 40 Ah batteries coupled in series with each other, and each battery has a voltage of 3.6 volts, so that the first battery assembly is capable of generating 24 KW power during a charge process of an hour, and the second battery assembly has the same structure and is capable of generating 48 KW power during a charge process of an hour.

6. The automobile quick charge control device according to claim 3, wherein the node switch is a programmable current switch for charging the battery units of the first battery assembly and the second battery assembly one by one.

7. The automobile quick charge control device according to claim 3, further comprising a transformer with an end electrically coupled to a Mains power and the other end electrically coupled to the vehicle controller, and the transformer being also electrically coupled to each node switch of the first battery assembly and the second battery assembly, and the transformer converting AC of the Mains power into DC, and converting the DC into a plurality of currents, and the vehicle controller controlling each node switch to ON, and allowing each battery unit of the first battery assembly and each battery unit of second battery assembly to charge simultaneously by the currents.

8. The automobile quick charge control device according to claim 1, wherein the electric vehicle body includes at least one roller, and the roller is a rotational rolling member pressing on the ground, and the roller is linked to a pushrod, and the pushrod is further linked to a link rod, and the link rod keeps displacing reciprocally and actuates at the power generator to drive the power generator to generate electric power.

9. The automobile quick charge control device according to claim 8, wherein the roller has more than one equidistant protrusions at the periphery of the roller.

10. The automobile quick charge control device according to claim 1, wherein the electric vehicle body comprises:
    at least one roller, pivotally coupled to a hub of the vehicle body, and touching the ground when the roller is rolling, and the roller having at least one groove;
    at least one push slider, installed in the groove, and having at least one pushrod, and an end of the push slider in contact with the ground having an arc bottom, and the pushrod being abutted by a spring to protrude in a direction towards the outer side of the roller;

at least one power generator, installed at an opposite pushing position of the pushrod, and electrically coupled to the power storage module;

thereby, when the vehicle body travels, the roller is driven to roll, and the push slider presses the ground and slides and retracts to transmit kinetic energy to the power generator, and then the power generator converts the kinetic energy into electric energy and stores the electric energy in the power storage module.

11. The automobile quick charge control device according to claim 10, wherein the spring is positioned and abutted against the groove to push the pushrod, and the pushrod has a ball bearing passed and installed in the groove.

12. The automobile quick charge control device according to claim 10, wherein the pushrod has an arc top opposite to the other end of the arc bottom, and the arc top has an arc sliding surface.

13. The automobile quick charge control device according to claim 10, wherein the groove has a side slot formed on both sides of the groove separately, and both sides of the push slider are coupled to a side slider separately, and the side slider is coupled to an edge of the arc bottom, and the side slider slides with respect to the side slot, and the side sliders have at least one ball bearing passed and installed in the side slot.

14. The automobile quick charge control device according to claim 1, wherein when the first battery assembly supplies electric power to a power consuming device of a car, and the electric power is consumed to a remained power level of 10%~20%, the vehicle controller pauses supplying power to the first battery assembly, and lets the second battery assembly take over the power supply, and all power generation devices charge the first battery assembly until the first battery assembly is fully charged, and when the second battery assembly takes over the power supply, and the electric power is consumed to a remained power level of 10%~20%, the vehicle controller pauses supplying power to the second battery assembly and lets the first battery assembly take over the power supply again, and the power generation device charges the first battery assembly and the second battery assembly alternately.

* * * * *